US009634547B1

United States Patent
Orlowski et al.

(10) Patent No.: US 9,634,547 B1
(45) Date of Patent: Apr. 25, 2017

(54) MOTOR GROUNDING SEAL

(71) Applicant: Inpro/Seal LLC, Rock Island, IL (US)

(72) Inventors: David C. Orlowski, Punta Gorda, FL (US); Thomas D. Coe, Rock Island, IL (US)

(73) Assignee: Inpro/Seal LLC, Rock Island, IL (US)

( * ) Notice: Subject to any disclaimer, the term of this patent is extended or adjusted under 35 U.S.C. 154(b) by 438 days.

(21) Appl. No.: 14/188,236

(22) Filed: Feb. 24, 2014

Related U.S. Application Data

(63) Continuation of application No. 13/855,355, filed on Apr. 2, 2013, now abandoned, which is a continuation of application No. 13/103,805, filed on May 9, 2011, now abandoned, which is a continuation-in-part of application No. 12/401,331, filed on Mar. 10, 2009, now abandoned, which is a continuation of application No. 11/378,208, filed on Mar. 17, 2006, now Pat. No. 7,521,827.

(60) Provisional application No. 60/693,548, filed on Jun. 25, 2005.

(51) Int. Cl.
*H02K 11/00* (2016.01)

(52) U.S. Cl.
CPC ................. *H02K 11/0089* (2013.01)

(58) Field of Classification Search
CPC ........ H02K 5/10; H02K 5/124; H02K 5/1732; H02K 11/0089; H02K 11/21; H02K 11/225; H02K 11/40; H02K 13/003; H01R 39/12; H01R 39/64; F16J 15/4478; G11B 19/2009; H05F 3/02; H05F 3/04
USPC ......... 310/68 R, 72, 85, 219, 220, 221, 248, 310/249; 29/596–598
See application file for complete search history.

(56) References Cited

U.S. PATENT DOCUMENTS

| 2,269,614 A | 1/1942 | Von Soden |
| 3,286,069 A | 11/1966 | Bugg |
| 3,785,049 A | 1/1974 | Tatsumi et al. |

(Continued)

FOREIGN PATENT DOCUMENTS

| EP | 0291295 A2 | 11/1988 |
| EP | 1967774 A | 9/2008 |

(Continued)

OTHER PUBLICATIONS

The Intellectual Property Office, Taiwan, Office Action, Mar. 14, 2016.

*Primary Examiner* — Tran Nguyen
(74) *Attorney, Agent, or Firm* — Hamilton IP Law, PC; Jay R. Hamilton; Charles A. Damschen

(57) ABSTRACT

A shaft seal assembly is disclosed having a stator including a main body and axial and radial projections therefrom. The rotor may be radially extended to encompass the axial and radial projections from said stator. A passageway formed between the radial projection of stator and rotor results in an axial passageway having its opening facing rearwardly from the rotor and away from the source of impinging coolant and/or contaminant. A concentric circumferential receptor groove in the stator facing the housing allows insertion of a conductive insert for transmission of electrostatic charge away from the shaft through the shaft seal assembly to the housing and ground. The receptor groove is opposite the axial passageway and provides for both a substantially lower contaminant environment and improved engagement with the conductive insert.

14 Claims, 7 Drawing Sheets

(56) References Cited

U.S. PATENT DOCUMENTS

| | | | |
|---|---|---|---|
| 3,997,224 A | 12/1976 | Ogawa et al. | |
| 4,189,702 A | 2/1980 | Maloy | |
| 4,246,508 A | 1/1981 | Zimmer | |
| 4,347,456 A | 8/1982 | Chabrerie | |
| 4,403,164 A | 9/1983 | Preece | |
| 4,483,574 A | 11/1984 | Chabrerie et al. | |
| 4,515,417 A | 5/1985 | Shiraishi | |
| 4,575,102 A | 3/1986 | Raj et al. | |
| 4,685,021 A | 8/1987 | Kortschinski et al. | |
| 4,801,270 A | 1/1989 | Scarlata | |
| 4,823,039 A | 4/1989 | Lynch | |
| 4,831,295 A * | 5/1989 | Posedel | H02K 11/40 310/221 |
| 4,850,881 A | 7/1989 | Lagier et al. | |
| 4,855,631 A | 8/1989 | Sato et al. | |
| 4,954,084 A * | 9/1990 | Pugh | H01R 4/66 439/100 |
| 5,010,441 A | 4/1991 | Fox et al. | |
| 5,661,356 A * | 8/1997 | Fisher | H01R 39/12 310/219 |
| 5,799,905 A | 9/1998 | Rokita | |
| 5,804,903 A * | 9/1998 | Fisher | H01R 39/12 310/219 |
| 5,812,908 A | 9/1998 | Larocca et al. | |
| 5,912,516 A | 6/1999 | Atkinson et al. | |
| 5,967,524 A | 10/1999 | Fedorovich | |
| 5,988,996 A | 11/1999 | Brookbank et al. | |
| 6,145,843 A | 11/2000 | Hwang | |
| 6,386,546 B1 | 5/2002 | Fedorovich | |
| 6,390,477 B1 | 5/2002 | Drago et al. | |
| 6,419,233 B2 * | 7/2002 | Orlowski | F16J 15/4478 277/411 |
| 6,530,694 B2 * | 3/2003 | Takemura | F16C 41/002 384/476 |
| 6,608,410 B2 | 8/2003 | Sato et al. | |
| 6,670,733 B2 * | 12/2003 | Melfi | H02K 11/40 310/68 R |
| 6,913,265 B2 | 7/2005 | Datta | |
| 6,955,473 B2 | 10/2005 | Reddehase et al. | |
| 6,972,052 B2 | 12/2005 | Krumma et al. | |
| 6,984,906 B1 | 1/2006 | Martiny, Jr. | |
| 7,071,589 B2 | 7/2006 | Bramel et al. | |
| 7,136,271 B2 | 11/2006 | Oh et al. | |
| 7,193,836 B2 | 3/2007 | Oh et al. | |
| 7,396,017 B2 | 7/2008 | Orlowski et al. | |
| 7,436,091 B2 * | 10/2008 | Thomas | H01R 39/46 123/143 C |
| 2001/0017495 A1 | 8/2001 | Sato et al. | |
| 2001/0040099 A1 | 11/2001 | Pedersen et al. | |
| 2002/0121821 A1 | 9/2002 | Ritter | |
| 2002/0136161 A1 | 9/2002 | Cleereman et al. | |
| 2003/0057783 A1 | 3/2003 | Melfi | |
| 2003/0086630 A1 | 5/2003 | Bramel et al. | |
| 2003/0235354 A1 | 12/2003 | Orlowski et al. | |
| 2004/0233592 A1 * | 11/2004 | Oh | G11B 19/2009 361/23 |
| 2006/0007609 A1 | 1/2006 | Oh et al. | |
| 2007/0159017 A1 | 7/2007 | Martin et al. | |
| 2007/0241514 A1 | 10/2007 | Orlowski et al. | |
| 2010/0127585 A1 | 5/2010 | Fee et al. | |
| 2010/0176673 A1 | 7/2010 | Wright et al. | |

FOREIGN PATENT DOCUMENTS

| | | |
|---|---|---|
| JP | 0928053 A | 1/1997 |
| JP | 11201264 A | 7/1999 |
| JP | 2004040926 A | 2/2004 |
| KR | 1019970004226 A | 1/1997 |
| WO | 9805890 A | 2/1998 |

\* cited by examiner

MOTOR GROUNDING SEAL

CROSS-REFERENCE TO RELATED APPLICATIONS

The present application is a continuation of and claims priority from U.S. patent application Ser. No. 13/855,355 filed on Apr. 2, 2013, which application was a continuation of and claimed priority from U.S. patent application Ser. No. 13/103,805 filed on May 9, 2011 (now abandoned), which application was a continuation-in-part of and claimed priority from U.S. patent application Ser. No. 12/401,331 filed on Mar. 10, 2009 (now abandoned), which application was a continuation of and claimed priority from U.S. patent application Ser. No. 11/378,208 filed on Mar. 17, 2006 (now U.S. Pat. No. 7,521,827), which claimed the benefit of U.S. provisional App. No. 60/693,548, filed Jun. 25, 2005, all of which are incorporated herein in their entireties.

FIELD OF THE INVENTION

The present invention relates to an improved bearing isolator sealing device, and more particularly, to a bearing isolator for directing electrostatic charge to ground while retaining lubrication solution and repelling contamination such as water, dust, dirt, sand and paper stock from the bearing environment and away from the shaft grounding ring, within the bearing cavity of a hub assembly such as an electrical motor bearing for engagement with a rotatable shaft.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX (Not Applicable)

BACKGROUND OF THE INVENTION

This invention relates generally to shaft sealing devices for use with rotating equipment. Adequate maintenance of rotating equipment is difficult to obtain because of extreme equipment duty cycles, the lessening of service factors, design, and the lack of spare rotating equipment in most processing plants. This is especially true of machine tool spindles, wet-end paper machine rolls, aluminum rolling mills, and steam quench pumps and other equipment utilizing extreme contamination affecting lubrication. Various forms of shaft sealing devices have been utilized to try to protect the integrity of the bearing environment, including rubber lip seals, clearance labyrinth seals, and attraction magnetic seals. Lip seals or other contacting shaft seals can quickly wear to failure and are also known to permit excessive amounts of moisture and other contaminants to immigrate into the oil reservoir of the operating equipment before seal failure had exposed the interface between the rotor and the stator to the contaminants or lubricants at the radial extremity of the seal. The problem of seal wear and damage as applied to electrical motors using variable frequency drives is compounded because of the very nature of the control of electricity connected to variable frequency drive (VFD) controlled motors.

VFDs regulate the speed of a motor by converting sinusoidal line alternating current (AC) voltage to direct current (DC) voltage, then back to a pulse width modulated (PWM) AC voltage of variable frequency. The switching frequency of these pulses ranges from 1 kHz up to 20 kHz and is referred to as the "carrier frequency." The ratio of change in voltage to the change in time ($\Delta V/\Delta T$) creates what has been described as a parasitic capacitance between the motor stator and the rotor, which induces a voltage on the rotor shaft. If the voltage induced on the shaft, which is referred to as "common mode voltage" or "shaft voltage," builds up to a sufficient level, it can discharge to ground through the bearings. Current that finds its way to ground through the motor bearings in this manner is called "bearing current."[1]

[1] http://www.greenheck.com/technical/tech_detail.php?display=files/Product_guide/fall7_03

There are many causes of bearing current including voltage pulse overshoot in the VFD, non-symmetry of the motor's magnetic circuit, supply imbalances, and transient conditions, among other causes. Any of these conditions can occur independently or simultaneously to create bearing currents in the motor shaft.[2]

[2] http://www.greenheck.com/technical/tech_detail.php?display=files/Product_guide/fall7_03

Shaft voltage accumulates on the rotor until it exceeds the dielectric capacity of the motor bearing lubricant, then the voltage discharges in a short pulse to ground through the bearing. After discharge, the voltage again accumulates on the shaft and the cycle repeats itself. This random and frequent discharging has an electric discharge machining (EDM) effect, causing pitting of the bearing's rolling elements and raceways. Initially, these discharges create a "frosted" or "sandblasted" effect. Over time, this deterioration causes a groove pattern in the bearing race called "fluting," which is an indication that the bearing has sustained severe damage. Eventually, the deterioration will lead to complete bearing failure.[3]

[3] See www.Greenheck.com

The prior art teaches numerous methods of mitigating the damage shaft voltages cause, including using a shielded cable, grounding the shaft, insulated bearings, and installation of a Faraday shield. For example, U.S. Pat. No. 7,193,836 discloses devices for controlling shaft current, which devices are designed to induce ionization in the presence of an electrical field.

Most external applications add to costs, complexity, and exposure to external environmental factors. Insulated bearings provide an internal solution by eliminating the path to ground through the bearing for current to flow. However, installing insulated bearings does not eliminate the shaft voltage, which will still find the lowest impedance path to ground. Thus, insulated bearings are not effective if the impedance path is through the driven load. Therefore, the prior art does not teach an internal, low wearing method or apparatus to efficaciously ground shaft voltage and avoid electric discharge machining of bearings leading to premature bearing failure.

SUMMARY OF THE INVENTION

An objective of the motor grounding seal is to provide an improvement to seals or bearing isolators to prevent leakage of lubricant and entry of contaminants by encompassing the stator within the rotor to create an axially directed interface at the radial extremity of the rotor. It is also an objective of the present invention to disclose and claim a seal or bearing isolator for rotating equipment that retains lubricants, prevents contamination and conducts and transmits and directs accumulated bearing current to ground.

Placement of a receptor groove in the stator of a shaft seal assembly allows insertion of a conductive insert in the stator. Although such a conductive insert may be constructed of any type of metal compatible with operating conditions and metallurgy, bronze, gold, or aluminum are believed to be preferred metals because of increased conductivity, strength, and resistance to corrosion and wear. Combining the receptor groove and conductive insert with the benefits of the improved bearing isolator reduces the environmental exposure of the conductive insert.

It has been found that a bearing isolator assembly having a rotor and stator manufactured from bronze has improved charge dissipation qualities. The preferred bronze metallurgy is that meeting specification 932 (also referred to as 932000 or "bearing bronze"). This bronze is preferred for bearings and bearing isolators because it has excellent load capacity and antifriction qualities. This bearing bronze alloy also has good machining characteristics and resists many chemicals. It is believed that the specified bronze offers increased shaft voltage collection properties comparable to the ubiquitous lighting rod due to the relatively low electrical resistivity (85.9 ohms-cmil/ft @ 68 F or 14.29 microohm-cm @ 20 C) and high electrical conductivity (12% IACS (@ 68 F or 0.07 MegaSiemens/cm @ 20 C) of the material selected.

Previous tests of a combination shaft seal assembly with a concentric inserted conductive brush engaged with the shaft have shown substantial reduction in shaft voltage and attendant electrostatic discharge machining. Direct seating between the conduction ring means and the bearing isolator portion of the motor ground seal improves the conduction to ground over a simple housing in combination with a conduction means as taught by the prior art. Those practiced in the arts will understand that this improvement requires the electric motor base to be grounded, as is the norm.

It is therefore an objective of the motor grounding seal to disclose and claim an electric motor for rotating equipment having a bearing isolator that retains lubricants, prevents contamination, and conducts and transmits and directs bearing current to ground.

It is another objective of the motor grounding seal to disclose and claim a bearing isolator for rotating equipment that retains lubricants, prevents contamination, and conducts electrostatic discharge (shaft voltage) to improve bearing operating life.

It is another objective of the motor grounding seal to disclose and claim a bearing isolator for rotating equipment that retains lubricants, prevents contamination, and provides adequate grounding.

It is another objective of the motor grounding seal to disclose and claim a bearing isolator for rotating equipment that retains lubricants, prevents contamination, and provides a low impedance ground path for the voltage to flow to earth ground without passing through the motor bearings or other components while protecting and isolating the conductive insert from the elements.

Other objects, advantages, and embodiments of the motor grounding seal will become apparent upon the reading the following detailed description and upon reference to drawings.

DETAILED DESCRIPTION—ELEMENT LISTING

| Description | Element No. |
| --- | --- |
| Drive bearing | 2 |
| Conductive brushes | 3 |
| Receptor groove | 4 |
| Brush ring | 5 |
| Metallic insert with solid conductor ring | 6 |
| Conductive insert ring | 7 |
| O-ring | 8 |
| Solid conductive ring | 9 |
| Rotatable shaft | 10 |
| Housing | 11 |
| Rotatable shaft center | 12 |
| Rotor | 13 |
| Rotor surface | 13a |
| Stator | 14 |
| Stator surface | 14a |
| O-ring | 15 |
| Brush ring frame | 16 |
| O-ring | 17 |
| Motor ground seal assembly | 18 |
| Radial projection | 19 |
| First radial Interface gap | 20 |
| Second radial interface gap | 21 |
| Stator groove | 22 |

DETAILED DESCRIPTION

Figure 1:
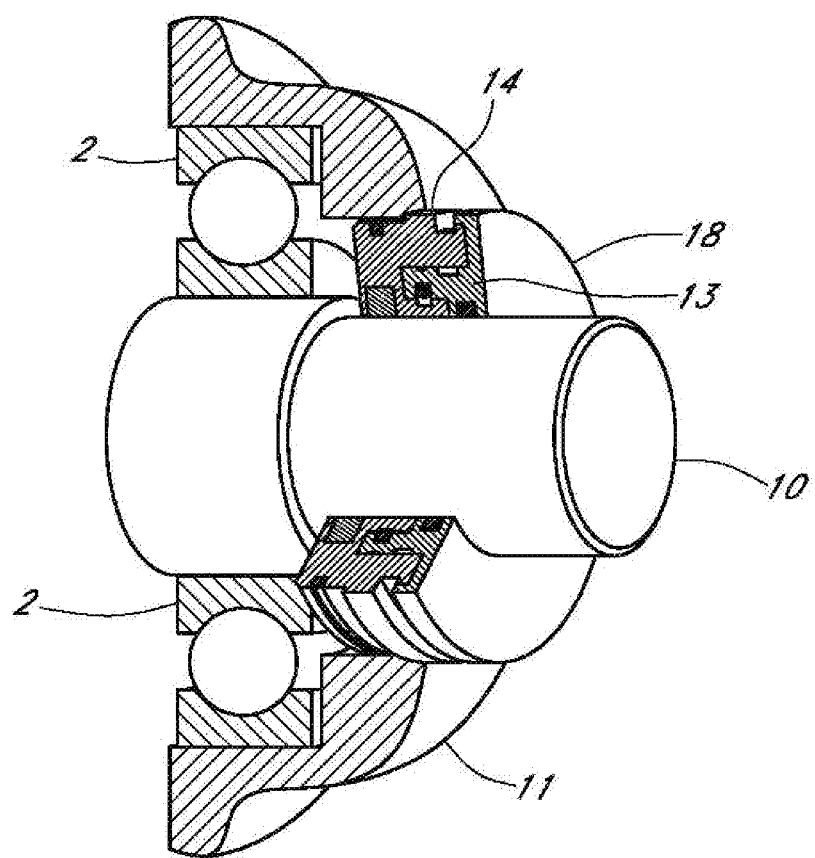
FIG. 1 is a perspective exterior view of motor ground seal assembly mounted to a motor housing.

FIG. 1 illustrates a perspective view of the motor ground seal assembly 18 applied to a rotatable shaft 10 of an electrical motor (not shown) having a variable frequency drive (VFD). The Motor Grounding Seal™ assembly 18 shown in FIG. 1 may be mounted to rotatable shaft 10 on either one or both sides of the motor housing assembly 11. The Motor Grounding Seal™ assembly 18 may be flange-mounted, press-fit, or attached by other means to a housing 11. The motor ground seal assembly 18 will also function with a rotating housing and stationary shaft (not shown).

As shown in FIGS. 2-6, the rotor 13 faces outboard and is engaged with an inboard facing stator 14. The receptor groove 4 allows placement of one of the following conductive inserts with the motor grounding seal assembly 18: a solid conductive ring having conductive filament brushes 3 attached therein, a solid conductive ring having conductive filament brushes 3 attached therein and a metallic annular frame surrounding the conductive ring, a metallic insert with solid conductor ring 6, or a conductive insert ring 7. The receptor groove 4 as-shown can also be utilized on other shaft seal assemblies and bearing isolators or combinations therein which use only labyrinths.

As shown in FIGS. 2-6, the location of the gap with respect to the rotor 13 and stator 14 surfaces and the direction of the opening interface gaps 20 and 21 are both important elements of one embodiment of the motor grounding seal assembly 18. The rotor 13 extends radially well beyond the major diameter of the stator 14. This permits the rotor 13 to encompass the also radially extended projection 19 of the stator 14. It is important that this radial extension of the rotor 13 extends beyond the basic radial dimension of stator 14. See U.S. Pat. No. 6,419,233 issued to Orlowski and incorporated by reference herein. This requires a departure from the prior art wherein the rotor 13 was radially co-extensive with the major diameter of the stator 14.

The second radial interface gap 21 between the rotor 13 and stator 14 that is exposed to the contamination or lubricants is now fixed in dimension and independent of any relative axial movement between the rotor 13 and the stator 14. The first radial interface gap 20 is still subject to variation in dimension by any relative axial movement between the rotor 13 and the stator 14. This relative movement is not significant to the operation in as much as only a small amount of contaminants have been able to enter the labyrinth because of the size and location of the first radial interface gap 20. The removal of the interface gap 21 from variations is more important in seals where the stator 13 and the rotor 14 are not restrained from relative movement.

The orientation of the opening of the interface gap 21 is important regardless of relative movement between the rotor 14 and stator 13. The axial orientation of the second radial interface gap 21 controls entrance of contaminants. Reduction or elimination of contaminants improves both the life and performance of the conductive means. The opening of the second radial interface gap 21 is now facing rearward toward the housing 11 and away from the contaminant stream. The contaminant or cooling stream will normally be directed along the axis of the shaft 10 and toward the housing 11.

A first stator groove 22 may be cut in the stator 14. This stator groove 22 enhances and accentuates the benefits of the radial extension of the rotor 13 and the stator 14 with the resultant orientation and independence of the second radial interface gap 21. The motor ground seal assembly 18 may be made from any machinable metal (such as stainless steel) or a metal having low resistivity, including but not limited to bronze, aluminum, copper, gold, and combinations thereof.

Figure 2:
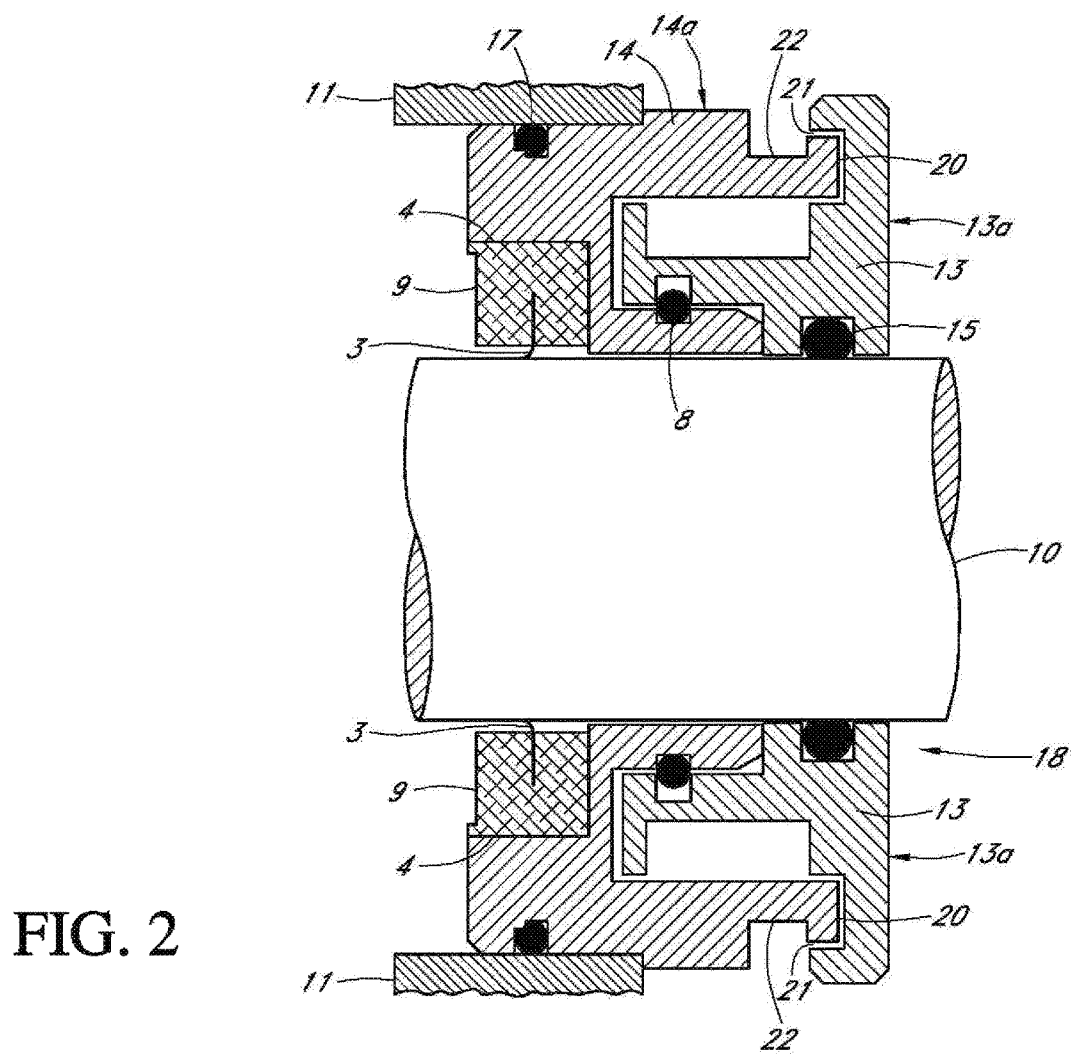
FIG. 2 is a sectional view of the present invention as shown in FIG. 1.

A second groove may be cut into the stator 14 on the inboard side facing away from the rotor 13 and into the housing 11. This receptor groove 4 allows insertion of a circumferential ring-like structure, sometimes referred to herein as a conductive insert. The embodiment illustrated in FIG. 2 shows a solid conductive ring 9 having conductive filaments or brushes 3 in contact with shaft 10. The concentric solid conduction ring 9 may be flange-mounted, press-fit, or attached by other means to and/or within receptor groove 4.

Figure 3:
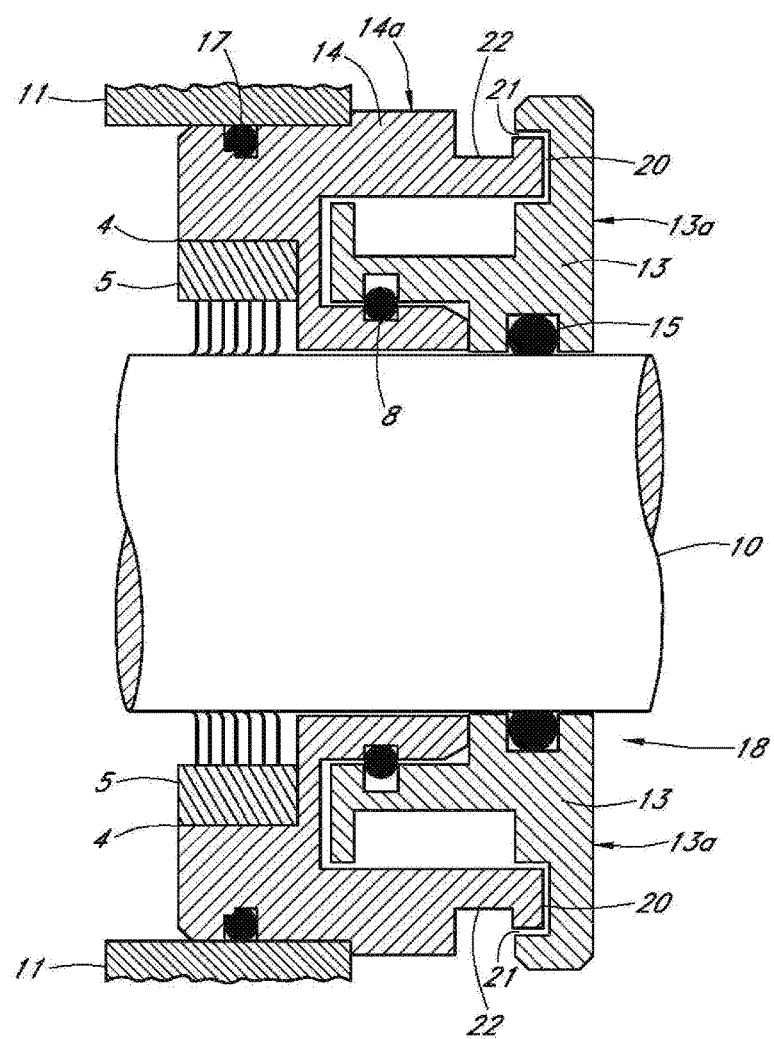
FIG. 3 is a sectional view of another embodiment of the present invention as shown in FIG. 2 wherein a conduction ring is shown with a plurality of conductive brushes.

FIG. 3 shows another embodiment of the motor ground seal assembly 18 wherein the conductive insert is a brush ring 5 having a metallic base or frame 16, preferably made from a low resistivity material such as bronze, copper, gold, or aluminum. The conductive insert may have a plurality of fibrous conductive brushes 3 engaged with rotatable shaft 10 for transmission of bearing currents to ground. In this embodiment, the circumference of the brush ring 5 is force-fitted into the receptor groove 4 in the motor ground seal assembly 18 by means of a slightly tapered bore (not shown) in the receptor groove 4 to accommodate imperfections and dimensional tolerance of the brush ring 5 surrounding the filament brushes 3.

In one embodiment of the motor ground seal assembly 18, the brush ring 5 may be as described in published U.S. Pat. Nos. 7,193,836 and 7,528,513. In such an embodiment, the brush ring 5 would incorporate technology sold as an "AEGIS SGR™ Conductive MicroFiber™ brush" by Electro Static Technology—an Illinois Tool Works Company. However, such an embodiment is not preferred. Instead, a preferred embodiment of the motor ground seal assembly 18 is one in which the brush ring 5 is configured such that the conductive brushes 3 are in constant contact with the shaft 10 at all times (i.e., when the shaft 10 is stationary and when the shaft 10 is rotating). This is due at least in part to the potential for brush ring frame 16 deformation, as described below.

The motor grounding seal assembly 18 improves conduction and reduces the effects of "bearing current" by enhancing and increasing the rigidity of circumferential brush ring 5, thereby increasing the resistance to deformation of the brush ring frame 16 during operation. Deformation of the brush ring 5 and frame 16 during operation destabilizes the spatial relationship between the tip of the conductive brushes 3, or the shaft facing surfaces of other conductive means, and the rotating shaft 10. The resulting change in spatial relationship, which although small and within normal machine operating tolerances, negatively affects the conduction of the electrostatic discharge (shaft voltage) from the rotating shaft 10 to ground, thus resulting in the decreased performance of prior art grounding devices.

Ensuring continuous contact between the conductive brushes 3 and the shaft 10 both when the shaft 10 is rotating and when it is stationary prevents decreased performance caused by brush ring 5 deformation. Accordingly, conduction of static charges from the shaft 10 to the conductive brushes 3 is preferred as opposed to the ionization described in U.S. Pat. No. 7,193,836. One embodiment of a motor ground seal assembly 18 configured to ensure this continuous contact includes conductive brushes 3 that are sized to be long enough so as to overcome any windage caused by the rotation of the shaft 10.

The performance of the motor ground seal assembly 18 disclosed and claimed herein is further improved by aggressive interference between the conductive insert and receptor groove 4 of the motor ground seal assembly 18. The outside diameter of the brush ring 5 may be up to 0.004 inches (0.102 mm) greater than the inside diameter of the receptor groove 4. The performance of the motor ground seal assembly 18 is further improved by aggressive interference between the motor grounding seal assembly 18 and the housing 11 of the motor. The outside diameter of the stator may be up to 0.004 inches (0.102 mm) greater than the inside diameter of the motor housing 11.

Figure 4:
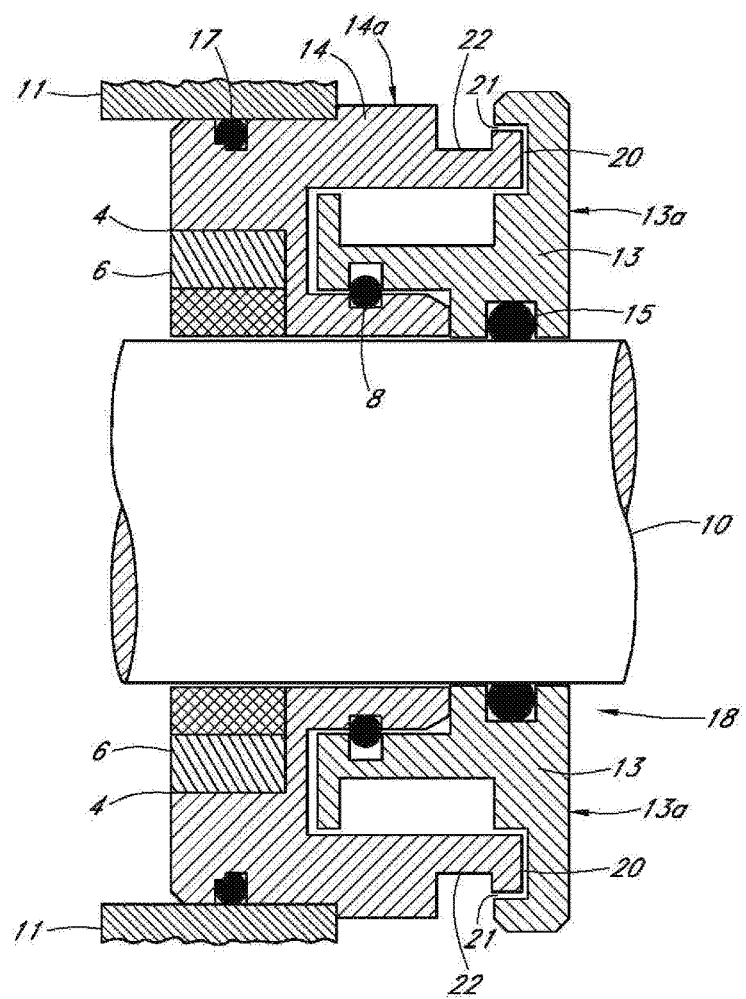
FIG. 4 is a sectional view of another embodiment of the present invention wherein a metallic conduction ring is shown with an insert having conductive properties.

FIG. 4 shows another embodiment of the motor ground seal assembly 18 wherein the metallic insert with solid conductor ring 6 has a metallic base, preferably a low resistivity material such as bronze, copper, gold, or aluminum, and forms a circumferential conductive ring around the rotating shaft 10 when inserted into the receptor groove 4 of the stator 14. A portion of the solid conductor ring 6 may then engage the rotatable shaft 10 for transmission of bearing currents to ground.

Figure 5:
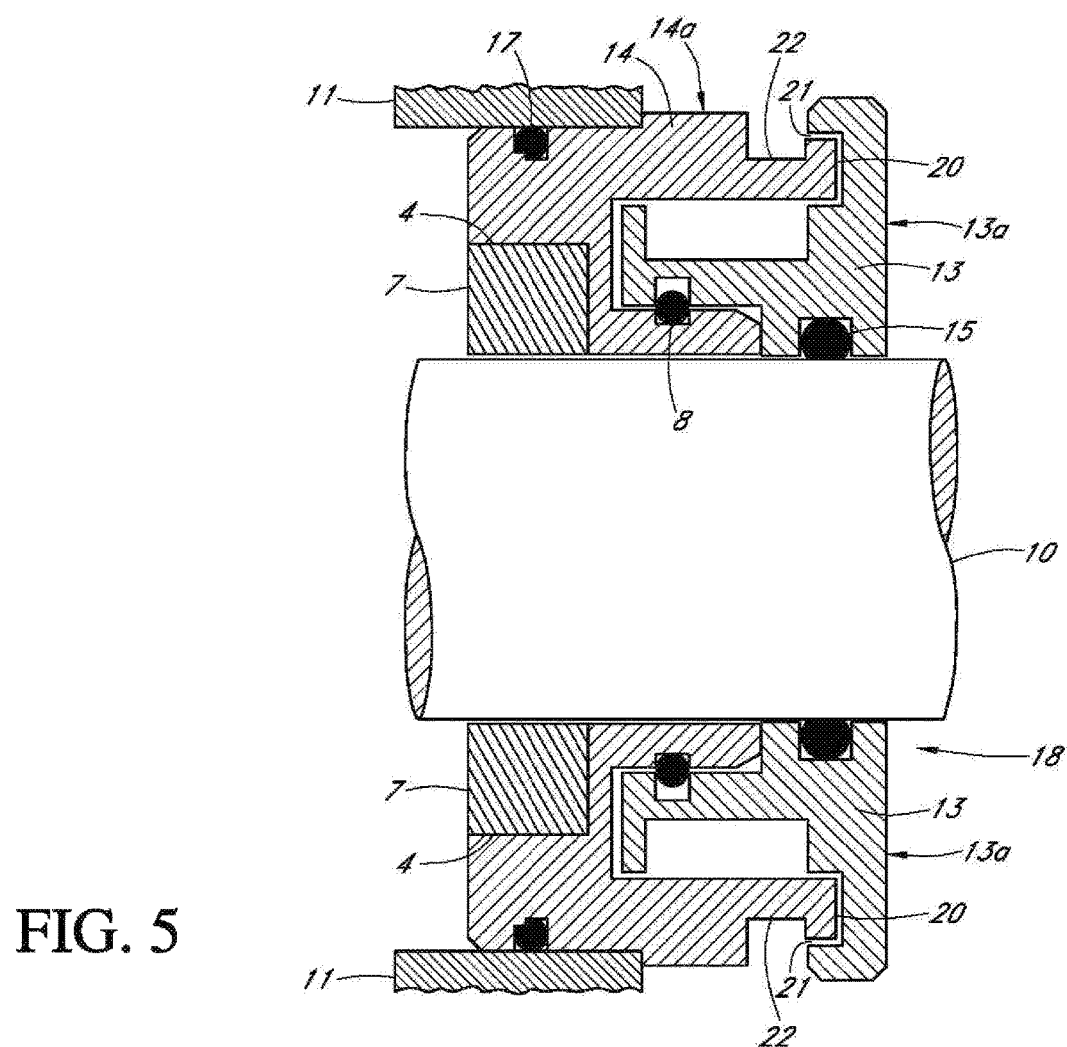
FIG. 5 is a sectional view of another embodiment as shown in FIG. 2 wherein the conductive ring is solid.

FIG. 5 shows another embodiment of the motor ground seal assembly 18 wherein the conductive insert ring 7 is a concentric circumferential ring affixed within the receptor groove 4 of the stator 14 for engagement with shaft 10 for transmission of bearing currents to ground. Reduction of deformity through an aggressive interference between the conductive insert/receptor groove 4 and motor ground seal assembly 18/housing 11 is contemplated for the embodiments shown and described at FIGS. 4 and 5.

Figure 6:
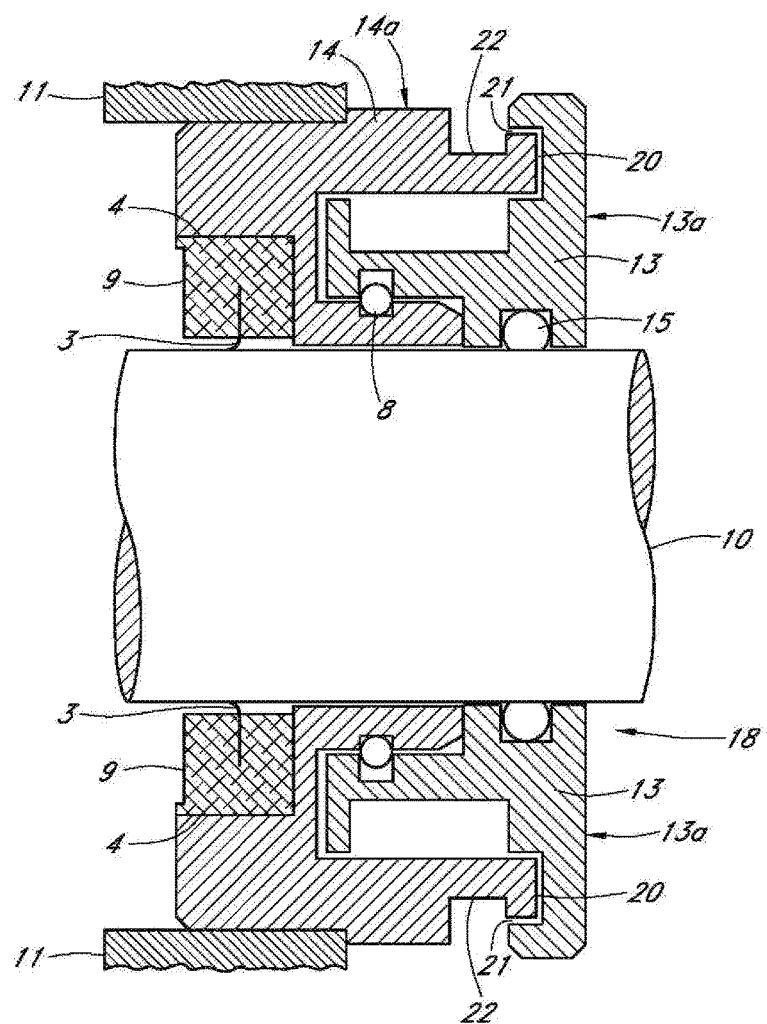
FIG. 6 is another embodiment of the present invention as shown in FIG. 2.

The motor ground seal assembly 18 may be used with an o-ring 17 between stator 14 and motor housing 11 as shown in preceding FIGS. 1-5. Performance of the motor ground seal assembly 18, however, may be further improved by eliminating o-ring 17 and its companion groove as shown in FIG. 6. The non-conductive nature of o-ring 17 can impede conductivity between the motor ground seal assembly 18 and motor housing 11 thereby decreasing the overall charge dissipation performance of the motor ground seal assembly 18.

Figure 7:
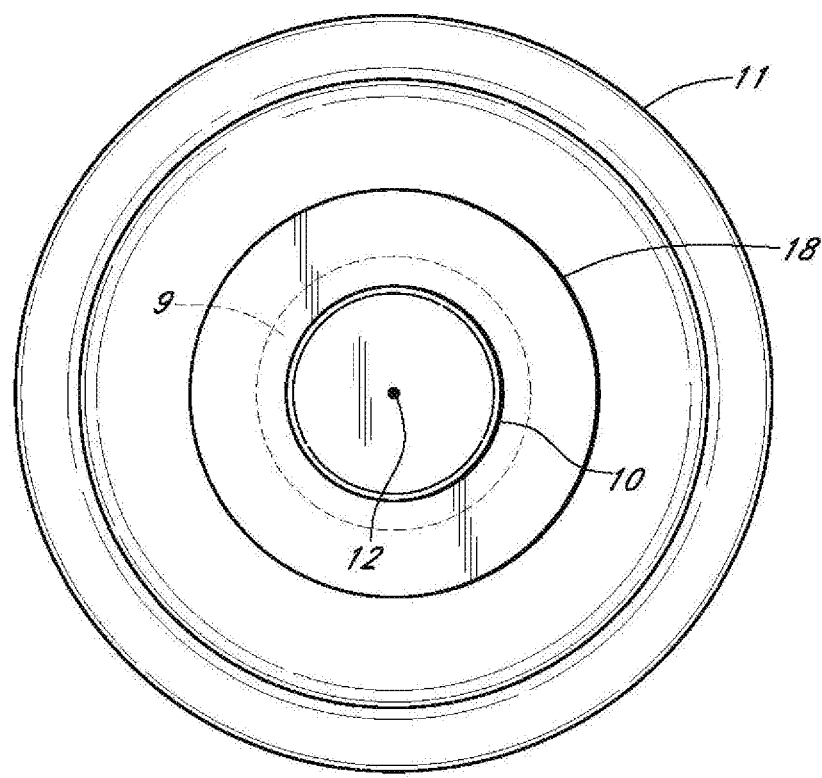
FIG. 7 is a side view of the present invention illustrating the concentric nature of the invention.

As shown in FIG. 7, the motor ground seal assembly 18 in combination with the motor housing 11 creates a stable concentric system with the rotating shaft 10 as its center point 12. Inserting the combination of conductive brushes 3, brush rings 5, or conductive inserts into the motor ground seal assembly 18 within the motor housing 10, and press or force fitting the various conducting elements (conductive insert, stator 13 and housing 11) together, provides a relatively fixed and stable spatial relationship between the conducting elements, thereby improving the collection and conduction of electrostatic discharge (shaft voltage) from the rotating shaft 10 to ground through the conducting elements of the motor ground seal assembly 18. This improved motor ground sealing system directly seats major elements together, which compensates for motor shafts 10 that are not necessarily perfectly round, and ensures the variation or change in distance from the brush tips 3 to the shaft 10 surface caused by external forces acting on the motor ground sealing system are minimal, thus promoting effective conduction of shaft voltage.

Having described the preferred embodiment, other features of the present invention will undoubtedly occur to those versed in the art, as will numerous modifications and alterations in the embodiments of the invention illustrated, all of which may be achieved without departing from the spirit and scope of the invention.

The invention claimed is:

1. A method for extending a life of a bearing comprising:
   a. providing a housing for an electric motor, wherein said housing is electrically grounded;
   b. providing a shaft extending from said piece of rotatable equipment, wherein said shaft is rotatable with respect to said housing, and wherein said shaft is engaged with said electric motor;
   c. positioning a said bearing within said housing, wherein said being allows said shaft to rotate with respect to said electric motor;
   d. isolating said bearing from an environment external to said housing using a bearing isolator, wherein said bearing isolator is secured to said housing at a stator of said bearing isolator;
   e. securing a rotor of said bearing isolator to said shaft, wherein said stator and said rotor are formed with a plurality of corresponding grooves and projections such that said stator and rotor are abutted and intermeshed with one another to form a labyrinth seal during use;
   f. engaging a conductive insert with said stator, wherein said conductive insert is in electrical communication with said stator at a radially external surface of said conductive insert, and wherein said conductive insert is in electrical communication with and continually contacts said shaft at a radially internal surface of said conductive insert both when said shaft is at rest and when said shaft is rotating; and,
   g. providing a path to ground from said shaft through said bearing isolator, wherein said path passes from said housing to said stator, from said stator to a conductive insert secured to said stator, and from said conductive insert to said shaft.

2. The method according to claim 1 wherein said conductive insert is further defined as being positioned in a receptor groove fashioned in said stator.

3. The method according to claim 1 wherein said conductive insert is further defined as having a plurality of conductive brushes extending therefrom toward said shaft, and wherein said plurality of conductive brushes are in contact with said shaft.

4. The method according to claim 1 wherein a radial space between a rotor radial projection and a stator radial projection forms a first axial passage.

5. The method according to claim 4, wherein said first axial passage includes a first axial passage opening to a space in said stator and facing said housing.

6. The method according to claim 5, wherein a portion of said stator surrounds a portion of said rotor.

7. The method according to claim 1, wherein a rotor radial projection extends radially beyond any portion of said stator.

8. A method for simultaneously isolating a bearing and providing a path to ground away from said bearing, said method comprising:
   a. providing a housing for an electric motor, wherein said housing is electrically grounded, and wherein said electric motor is positioned within said housing;
   b. providing a shaft extending from said piece of rotatable equipment, wherein said shaft is rotatable with respect to said housing, and wherein said shaft is engaged with said electric motor;
   c. positioning a said bearing within said housing, wherein said being allows said shaft to rotate with respect to said electric motor;
   d. securing a stator of a bearing isolator to said housing;
   e. providing said stator with a main body, wherein said main body of said stator is engaged with and in electrical communication with said housing;
   f. providing said stator with a plurality of projections extending both axially and radially beyond said main body;
   g. securing a rotor of said bearing isolator to said rotatable shaft;
   h. providing said rotor with a main body;
   i. providing said rotor with a plurality of projections extending both axially and radially beyond said main body, wherein said rotor projections correspond to said stator projections so as to form a labyrinth seal between said stator and said rotor; and
   j. securing a conductive insert to said stator, wherein said conductive insert is in electrical communication with said stator at a radially external surface of said conductive insert, and wherein said conductive insert is in electrical communication with continually contacts said shaft at a radially internal surface of said conductive insert both when said shaft is at rest and when said shaft is rotating, and wherein said conductive insert provides said path to ground from said shaft to said conductive insert, from said conductive insert to said stator, and from said stator to said housing.

9. The method according to claim 8 wherein said conductive insert is further defined as being positioned in a receptor groove fashioned in said stator.

10. The method according to claim 8 wherein said conductive insert is further defined as having a plurality of conductive brushes extending therefrom toward said shaft, and wherein said plurality of conductive brushes are in contact with said shaft.

11. The method according to claim 8 wherein a radial space between a rotor radial projection and a stator radial projection forms a first axial passage.

12. The method according to claim 10, wherein said first axial passage includes a first axial passage opening to a space in said stator and facing said housing.

13. The method according to claim 11, wherein a portion of said stator surrounds a portion of said rotor.

14. The method according to claim 7, wherein a rotor radial projection extends radially beyond any portion of said stator.

* * * * *

UNITED STATES PATENT AND TRADEMARK OFFICE
CERTIFICATE OF CORRECTION

| | | |
|---|---|---|
| PATENT NO. | : 9,634,547 B1 | Page 1 of 1 |
| APPLICATION NO. | : 14/188236 | |
| DATED | : April 25, 2017 | |
| INVENTOR(S) | : David C. Orlowski and Thomas D. Coe | |

It is certified that error appears in the above-identified patent and that said Letters Patent is hereby corrected as shown below:

In the Claims

Column 7, Claim 1, paragraph b, Lines 45, 46, replace "piece of rotatable equipment" with "housing."
Column 7, Claim 1, paragraph c, Line 50, replace "being" with "bearing."
Column 8, Claim 1, paragraph g, Line 5, replace "a" with "said."
Column 8, Claim 8, paragraph b, Lines 32, 33, replace "piece of rotatable equipment" with "housing."
Column 8, Claim 8, paragraph c, Line 37, replace "being" with "bearing."
Column 8, Claim 8, paragraph j, Line 58, after the word "with" insert --and.--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*